United States Patent [19]
Kakizaki

[11] 3,868,743
[45] Mar. 4, 1975

[54] WIPER ASSEMBLY FOR A MOTOR DRIVEN VEHICLES

[75] Inventor: Tadao Kakizaki, Yokohama, Japan

[73] Assignee: Nissan Motor Company, Limited, Yokohama, Japan

[22] Filed: Apr. 16, 1973

[21] Appl. No.: 351,446

[30] Foreign Application Priority Data
Apr. 19, 1972 Japan.............................. 47-46449

[52] U.S. Cl............................ 15/250.23, 15/250.32
[51] Int. Cl. .............................................. B60s 1/40
[58] Field of Search....... 15/250.01, 250.04, 250.36, 15/250.3, 250.23, 250.21, 250.32

[56] References Cited
UNITED STATES PATENTS

| | | | |
|---|---|---|---|
| 3,402,418 | 9/1968 | Le Roy ............................ | 15/250.01 |
| 3,626,543 | 12/1971 | Schaper ........................... | 15/250.21 |
| 3,718,941 | 3/1973 | Deutscher ....................... | 15/250.23 |

FOREIGN PATENTS OR APPLICATIONS
624,150    5/1949    Great Britain ................... 15/250.23

*Primary Examiner*—Peter Feldman

[57] ABSTRACT

A wiper assembly for wiping a circular or convex surface such as that of a headlight, search light, or side mirror of a vehicle, having an annular member mounted outwardly adjacent to and coaxial with a periphery of the surface, a pivot shaft rotatably mounted outwardly adjacent to the surface, a wiper arm attached to the pivot shaft and extending into the annular member, the extremity of which is oscillable within the annular member, a spring-hinge holder attached to the oscillating end of the wiper arm, a resilient wiper blade which is held by the spring-hinge holder and caused thereby to conform to the surface at all times and to the inner perimeter of the annular member when the wiper arm is at or near a limit of its oscillation, and a means of oscillably driving the pivot shaft.

1 Claim, 7 Drawing Figures

WIPER ASSEMBLY FOR A MOTOR DRIVEN VEHICLES

The present invention relates to a wiper assembly for a motor driven vehicle, and particularly to a wiper arm and blade assembly for wiping a circular or convex surface such as that of a headlight, search light, or side mirror of a motor driven vehicle.

Heretofore various proposals have been made for wiping the circular outer surface or convex lens of a headlight or similar device of a motor driven vehicle. One prior art headlight wiper arm and blade assembly comprises a wiper blade with a relatively longer length than the radius of the surface of the headlight so as to wipe a relatively greater area of the headlight, a pivot shaft rotatably mounted outside of the surface of the headlight with its axis oriented normally to the center of the headlamp, and a wiper arm attached to the pivot shaft and carrying thereon a wiper blade (see FIG. 1). This prior art device is inadequate in that the wiper blade will wipe only an inner area of the headlight with an aproximate shape at an annular sector as is shown in FIG. 1, and leave the outer areas unwiped with the result that the intensity of illumination of the headlight will be reduced.

Another prior art headlight wiper arm and blade assembly is bonded to the center of a headlight by an adhesive, and comprises an electric motor, a rotary shaft with its axis normal to the surface of the headlight, a worm gear assembly drivably connecting the rotary shaft to the motor, and a wiper arm attached to the rotary shaft and extending radially outward therefrom and carrying thereon a wiper blade which is held in contact with the surface of the headlight by the wiper arm. The wiper arm and blade are thus caused to rotate about the rotary shaft by the motor and wipe the surface of the headlight as shown in FIG. 2. This prior art device is inadequate in that since the wiper assembly is bonded to the surface of the headlight by an adhesive, the adhesive joint will be subjected to a torque in the rotational direction of the wiper arm which will cause it to weaken, and the adhesive will also be gradually melted by the heat from the headlight thus, there is a significant possibility that the wiper assembly may detach from the lens. Moreover, since the wiper blade and wiper arm are mounted on the surface of headlight even when the wiper is not in use, the light intensity of the headlight is reduced.

The present invention aims to provide improvement over the prior art devices of the types mentioned above.

Accordingly, an object of the present invention is to provide a wiper arm and blade assembly of an improved configuration for wiping a surface such as that of a headlight, search light, or side mirror of a motor driven vehicle, which will not reduce the light intensity of the headlight or search light, or the visibility through the side mirror when not in use.

Further objects and advantages of the present invention will become more apparent from the following description with reference being made to the accompanying drawings, wherein a preferred embodiment of the present invention is clearly shown.

Figure 1:
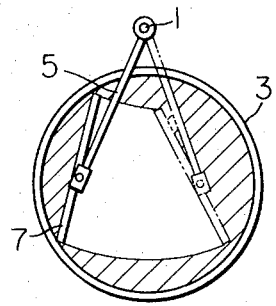
FIG. 1 is a plan view illustrating a wiper blade and arm assembly of a prior art headlight wiper.
Figure 2:
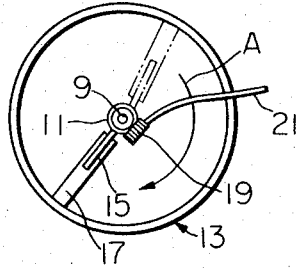
FIG. 2 is a plan view illustrating a wiper blade and arm assembly of another prior art headlight wiper.
Figure 3:
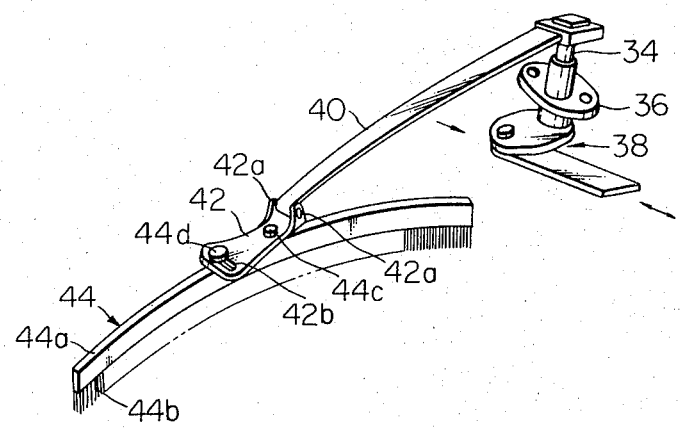
FIG. 3 is a plan view illustrating a wiper arm and blade assembly of a headlight wiper according to the present invention.

Referring to the accompanying drawings and particularly to FIGS. 1 and 2 there are shown two prior art headlight wipers as mentioned before.

In FIG. 1, a pivot shaft 1 is disposed outwardly adjacent to a headlight 3 with its axis oriented parallel to the beam direction of the headlight 3. A wiper arm 5 is attached to the pivot shaft 1 and carries near its extremity a wiper blade 7. The unwiped area of the headlight 3 is shown as hatched.

In FIG. 2, a rotary shaft assembly 9 is bonded to the center of a headlight 13, and is provided with a worm wheel 11. A wiper arm 15 attached to the rotary shaft assembly 9 carries at its outer end portion a wiper blade 17. A worm 19 is driven from a motor (not shown) by a cable 21, which meshes with the worm wheel 11 to produce rotation of the rotary shaft assembly 9, the wiper arm 15, and the wiper blade 17 in a direction shown by an arrow A.

The present invention will now be described hereinafter with reference to FIGS. 3 through 6. The invention will be described as applied to a headlight of a motor driven vehicle, but it will be noted that the invention can also be applied to a side mirror or other device having a circular or convex surface.

Referring now to FIGS. 3, 4a, 4b, and 5, there is shown a headlight 30 having a convex lens 32. The headlight 30 is installed on a motor driven vehicle (not shown) in a conventional manner facing substantially forward.

A pivot shaft 34 is disposed at a suitable location on the vehicle outwardly adjacent to the headlight 30 with its axis oriented normally to the center of the surface of the headlight 30. The pivot shaft 34 is rotatably received in a receptacle 36 securely attached to a suitable portion of the vehicle. A linkage member 38 of a linkage (not shown) for establishing a drivable connection between a wiper motor (not shown) and the pivot shaft 34 is coupled with the pivot shaft 34. A wiper arm 40 is attached to the pivot shaft 34 at one end and has attached to its other end a holder 42.

The holder 42 at one end portion thereof has formed a pair of lugs 42a. The holder 42 is spring-hinge connected to the end of the wiper arm 40 by means of a hinge pin and spring (not shown), the pin passing through the lugs 42a and the wiper arm 40, so that the holder 42 is at all times pushed toward the lens 32. The holder 42 has formed at the other end portion a pilot slot 42b.

A resilient wiper blade 44 comprises a resilient supporting member 44a and a wiper blade element 44b. As is clearly seen in FIG. 3, the supporting member 44a of the wiper blade 44 is provided on its upper surface with two pins 44c and 44d. The wiper blade 44 is pivotably carried by the holder by the pin 44c. The pilot slot 42b, through which the pin 44d extends, has the general shape of an annular sector with its center concentric with the center of the circular cross section of the pin 44c. Thus, the wiper blade 44 is allowed to rotate about the pin 44c to an extent determined by the arc length of the pilot slot 42b.

Figure 4A:
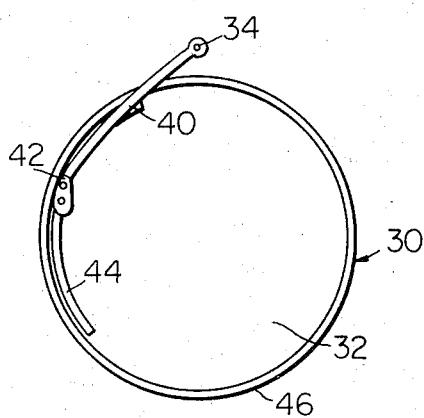
FIGS. 4a and 4b are plan views illustrating wiping operation of a headlight by the wiper arm and blade assembly according to the present invention.
Figure 4B:
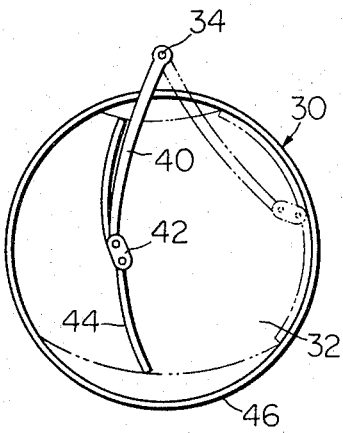
Figure 5:
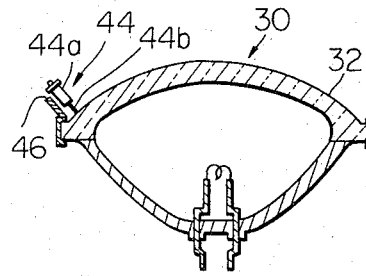
FIG. 5 is a sectional view of a headlight on which the wiper arm and blade assembly according to the present invention are installed.

As can best be seen in FIGS. 4a, 4b and 5, an annular member 46 is mounted on the vehicle (not shown) outwardly disposed from and concentric or coaxial with the headlight 30.

The resilient wiper blade 44 may be formed of a synthetic resin such as polypropylene or ABS, and should be resilient enough to conform to the convex surface of the lens 32 at all times, and to assume a shape curved along the inner perimeter of the annular member 46 upon contacting thereto when the wiper arm 40 is near one of its limits of oscillation. It will be noted that due to the configuration of the spring-hinge holder 42 and the wiper arm 40, the resilient wiper blade 44 will continually be held in contact with the lens 32.

Figure 6:
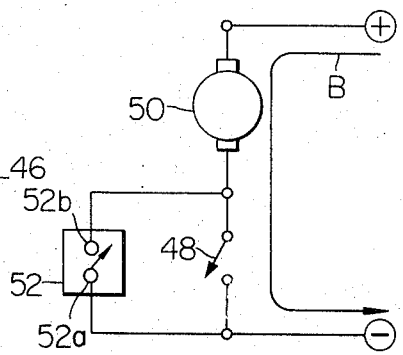
FIG. 6 is a wiring diagram of an electrical circuit for controlling a wiper driving motor which is used with the wiper arm and blade assembly shown in FIG. 3.

Referring now to FIG. 6, there is shown a conventional wiring diagram of a circuit for controlling a wiper driving motor 50 which is coupled through a linkage which is not shown but is well known in the art to the wiper arm and blade assembly in a manner as to cause rotational oscillation of the wiper arm 40 and wiper blade 44 which have been described above with reference to FIGS. 3, 4a, 4b and 5.

When a main switch 48 is closed, current will flow in a direction of an arrow B, causing a shaft (not shown) of the wiper motor 50 to rotate. The rotational motion of the motor shaft is converted to a rotational oscillatory motion of the wiper arm 40 through the linkage (not shown) in a conventional manner. A switch 52 is provided in parallel electrical connection with the main switch 48, and is so arranged as to be closed when the wiper arm 40 is at an intermediate position as shown by the solid member in FIG. 4b, and opened when the wiper arm 40 is at one or the other of its oscillatory limits as shown in FIG. 4a, and by the dashed member in FIG. 4b. Thus, it will be seen that if the main switch 48 is opened, the motor 50 will continue to be energized until the wiper arm 40 has reached one of its oscillatory limits as shown in FIG. 4a and by the dashed member in FIG. 4b, and that the wiper and arm assembly will never stop at an intermediate position as shown by the solid member in FIG. 4b thus partially covering the lens 32 and reducing the illumination therefrom.

As described above, due to the resilience of the wiper blade 44, the force exerted by the spring-hinge holder 42, and the freedom of rotation of the wiper blade 44 provided by the pilot slot 42b and pin 44d arrangement, the wiper blade 44 will be caused to conform to the inner perimeter of the annular member 46 when the wiper arm 40 is at or near an oscillatory extreme as shown in FIG. 4a or by the dashed member in FIG. 4b.

Thus it will be appreciated that due to the configuration of the wiper arm and blade assembly of the present invention, the wiping area is larger than that of the aforementioned wiper shown in FIG. 1.

It will also be appreciated that since the wiper blade conforms to the inner perimeter of the annular member which is disposed suitably outward from the circular surface when the wiper arm is at an oscillatory extreme, the wiper blade will dispose itself outside of the circular surface when not in use.

What is claimed is:

1. A wiper assembly for wiping a surface of circular convex shape, comprising:
    an annular member with an inner diameter greater than the peripheral diameter of the surface and adapted to be disposed concentric with the surface;
    a wiper arm, means oscillatably moving said wiper arm between two limiting positions on the inner perimeter of said annular member;
    a resilient wiper blade provided with two pins spaced longitudinally thereof; and
    a holder spring hinge connected to said wiper arm and having formed therein a hole and a slot, said holder receiving said two pins in the hole and slot, respectively, for permitting limited rotation of said resilient wiper blade with respect to said holder and biasing said resilient blade to the surface.

* * * * *